Aug. 6, 1957 R. J. McCOLLOCH 2,801,799
APPARATUS FOR PRODUCING CYCLICAL TEMPERATURE VARIATIONS
Filed July 24, 1953 2 Sheets-Sheet 1

ROBERT J. McCOLLOCH
INVENTOR

BY R. Hoffman
ATTORNEY

Aug. 6, 1957   R. J. McCOLLOCH   2,801,799
APPARATUS FOR PRODUCING CYCLICAL TEMPERATURE VARIATIONS
Filed July 24, 1953

ROBERT J. McCOLLOCH
INVENTOR

United States Patent Office 2,801,799
Patented Aug. 6, 1957

2,801,799

APPARATUS FOR PRODUCING CYCLICAL TEMPERATURE VARIATIONS

Robert J. McColloch, Pasadena, Calif., assignor to the United States of America as represented by the Secretary of Agriculture Application July 24, 1953, Serial No. 370,240

4 Claims. (Cl. 236—46)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the United States of America.

This invention relates to and has among its objects the provision of systems for producing cyclical temperature variations of any desired pattern and at continuously variable repetition rates in mechanically refrigerated storage chambers. A particular object of this invention is to provide method and apparatus for the above-mentioned purposes which is efficient though simple and inexpensive. Further objects and advantages of the invention will be obvious from the description herein taken in connection with the annexed drawing.

Figure 1:
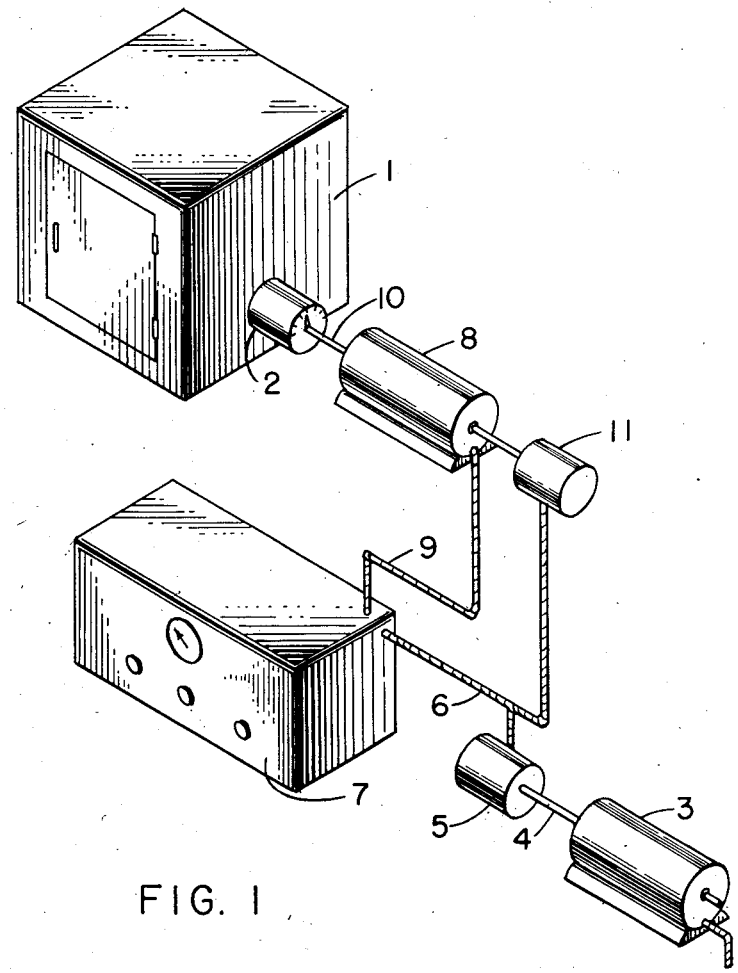
Figure 2:
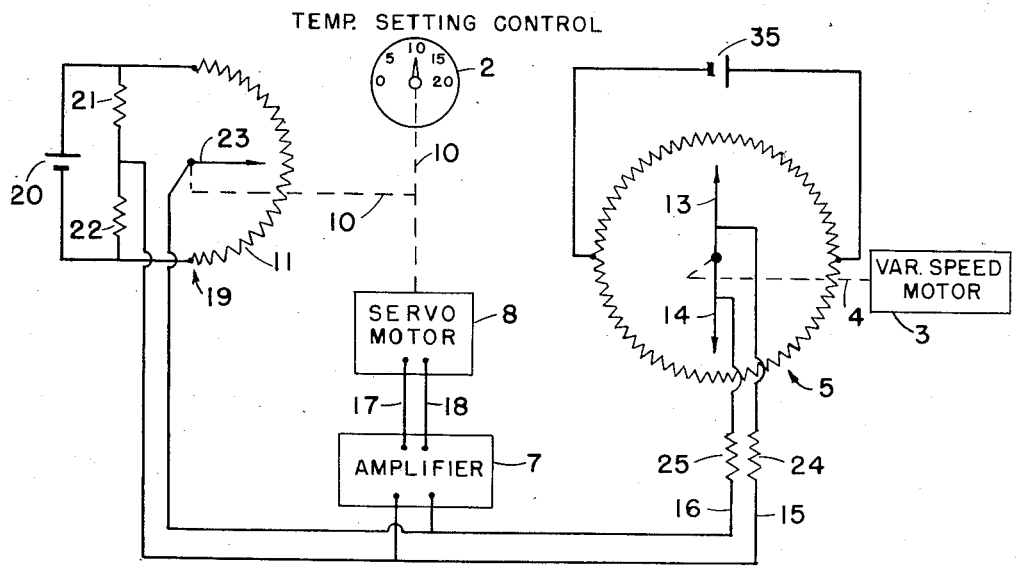
Figure 3:
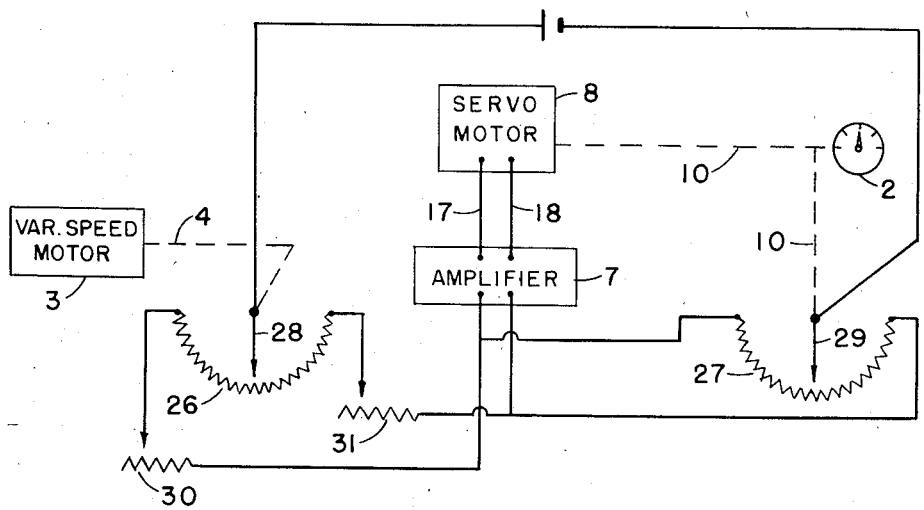

In the drawing, Fig. 1 is a three-dimensional view of one embodiment of this invention. Fig. 2 is a schematic diagram of the circuits involved in the embodiment of Fig. 1. Fig. 3 is a schematic diagram of an alternative system in accordance with this invention.

In the study of the stability of frozen food products it is necessary to subject the products to varying temperatures over a predetermined cycle thus to ascertain what effects would be caused by exposure of the products to above-freezing temperatures due to movement from one freezer to another, shipping, etc. The known devices for creating a cyclic pattern of varying temperature employ mechanical means for generating the pattern and require several types of power (electricity, compressed air, etc.) and special thermostatic controls. Being mechanical and usually requiring templates for the desired patterns, these devices are not adaptable to readily changeable patterns or readily and continuously variable repetition rates. Even when the same patterns of repetition are desired, separate templates must be employed if the absolute values of temperatures to be repeated are different.

The system described herein requires only one power source, namely, electricity. An almost limitless number of patterns may easily be generated and the absolute temperature values may be adjusted within wide limits for the same electrical pattern by simple changes in circuit parameters, for example, by adjustment of variable resistors incorporated in the circuit, as explained hereinafter. The system may be easily applied using the existing thermostat on the refrigerator to be controlled and, if desired, the system is capable of great precision by suitable choice of circuit parameters and the use of an error signal fed back into the balancing circuit.

Briefly described, the system of this invention comprises a refrigerator (the expression "refrigerator" is used herein as including devices capable of maintaining temperatures below room temperature or below the freezing point of water) equipped with a conventional temperature control by which the refrigerator thermostat may be adjusted thus to maintain any desired temperature within the refrigerator. A generator is provided for producing a current which varies in intensity in accordance with the desired pattern of temperature variation. This generator may be, for example, a potentiometer connected across a battery whereby on rotation of the potentiometer arm a current or voltage of varying intensity is produced. The signal produced by the generator is then fed into a conversion means whereby the signal is converted into a mechanical movement which varies as a function of the intensity of the signal. The conversion means which may be, for example, a servomotor with attached balancing circuit, is linked to the aforesaid temperature control. It is evident therefore that the generated signal causes the temperature control of the refrigerator to be moved through a pattern which is determined by the signal variation pattern. Thereby the temperature within the refrigerator is varied as a function of the signal pattern.

Referring now to the drawing wherein like numerals indicate like parts, the embodiment of Figs. 1 and 2 is described as follows.

Referring initially to Fig. 1, refrigerator 1 is equipped with a conventional thermostat and temperature setting control 2 whereby the temperature within the refrigerator may be maintained at any desired level. The rest of the apparatus shown serves to adjust control 2 through a predetermined pattern of movement.

Variable-speed motor 3 is connected via shaft 4 to potentiometer 5. As motor 3 rotates, potentiometer 5 produces a current of varying intensity, for example, a sine wave variation. The signal from potentiometer 5 is fed through cable 6 into D. C. amplifier 7 where the signal is amplified and then fed to servomotor 8 via cable 9. The servomotor is thus caused to rotate in a pattern which is a function of the pattern of the signal produced by potentiometer 5. Since servomotor 5 is connected by shaft 10 to control 2, it is evident that the temperature in refrigerator 1 will be varied according to a pattern which is a function of the signal produced by potentiometer 5. Shaft 10 of servomotor 8 is also connected to potentiometer 11 which together with associated circuit components acts as a balancer whereby when there is a change in the intensity of the signal produced by potentiometer 5, the servomotor will rotate to a new position and this movement will cause a corresponding change in the circuit relationships of potentiometer 11 whereby the servomotor will come to a stop in its new position of rotation.

In Fig. 2 is shown the wiring diagram of the various components illustrated in Fig. 1. Referring to Fig. 2, variable-speed motor 3 rotates the contact arm of potentiometer 5 via shaft 4 illustrated by the dotted line. The contact arm is divided into two mechanically, but not electrically, connected sections 13 and 14. A potential is impressed across the potentiometer 5 by battery 35 (1.5 volts, for example). As the contact arm 13, 14 rotates a signal of varying intensity is produced in wires 15 and 16 connected to sections 13 and 14, respectively. This signal is fed into amplifier 7 and the amplified signal is fed into servomotor 8 via wires 17 and 18 whereby to cause rotation of the servomotor 8 and consequent rotation of contact 2 via shaft 10.

The balancer designated generally as 19 consists of potentiometer 11, battery 20 (1.5 volts, for example), and resistors 21 and 22. Potentiometer 11 and resistors 21 and 22 constitute a resistance bridge and the resistance of these units may be 200, 100 and 100 ohms, respectively. The contact arm 23 of potentiometer 11 is mechanically connected to shaft 10 as indicated by the dotted line.

The operation of balancer 19 can be explained as follows. Assume first that contact arm 13, 14 is vertical and contact arm 23 is horizontal as depicted in Fig. 2. In this case there will be no current in wires 15 and 16. Assume then that contact arm 13, 14 moves an increment clockwise whereby a potential of say 0.1 volt will be impressed across wires 15 and 16. This will cause rotation of servomotor 8 through a predetermined number of degrees. When the servomotor rotates to this new position it also rotates contact arm 23 whereby balancer 19 then produces a counter-E. M. F. of 0.1 volt and the current in wires 15 and 16 is reduced to zero and servomotor 8 stops at its new position. It is evident that with each new increment of motion of contact arm 13, 14 the corresponding movement of servomotor 8 takes place with consequent stopping of the servomotor 8 by the action of balancer 9.

In the system of Figs. 1 and 2 the temperature of refrigerator 1 may be raised or lowered. This is so because when contact 13 is in contact with the upper half of potentiometer 5 rotation of servomotor will be in one direction, say, counterclockwise, whereas when contact 13 operates on the lower half of the potentiometer, the polarity of the signal will be reversed and the servomotor 8 will rotate in a reverse direction. Resistors 24 and 25 (300 ohms, each for example) are provided to prevent the sine wave voltage generated by potentiometer 5 from exceeding the balancing voltage available from bridge 21, 22, 23.

Referring to Fig. 3, the system therein illustrated may be employed to produce a steady increase in temperature at a predetermined rate. In this circuit the principle of a self-balancing servo-operated potentiometer is employed. Potentiometers 26 and 27 may be of the ten-turn helipot type. As contact arm 28 is advanced by variable speed motor 3 and shaft 4, the balancing servomotor 8 advances contact arm 29 via shaft 10 to maintain balance and since the thermostat control 2 is mechanically coupled via shaft 10 to the servomotor 8, the temperature in refrigerator 1 is also advanced. In this case the variable resistors 30 and 31, which may be of the decade box type, may be used to vary the ratio of the angular rotation of arm 29 for a given angular rotation of arm 28. In this manner it is possible to vary widely the balancing point and the absolute range of temperature setting produced by a given rotation of arm 28.

It is evident that many variations may be employed within the ambit of this invention. For example, the potentiometer designated as 5 in Figs. 1 and 2 produces a sine wave variation in D. C. voltage as it revolves through 360°. It is obvious that other potentiometric function generators could be used to generate waves of different type, for example, sawtooth waves, square waves, and so forth. It may be seen from Figs. 2 and 3 and is implicit in the principles on which this invention is based, that many particular types of bridge circuits may be employed to produce the same types of variation in temperature and the application of any other particular bridge arrangement is included within the scope of this invention. Instead of employing a potentiometric generator, one could employ capacitative or inductive methods for producing electrical waves in any desired mathematical wave form.

Regarding variable speed motor 3, any mechanism capable of producing a wide range of angular velocities may be used therefor. A variable frequency oscillator driving a synchronous motor is one example. Another is a repeat-cycle timer, which for example, can be made to actuate a relay at intervals of from less than one throw per second to one in five minutes. By means of a pinion on the relay, a notched wheel is advanced 1/64 of a turn for each throw of the relay. The wheel may be then used to drive the shaft of a gear reduction box having power take-offs at approximately 1:1, 1:16, 1:100, and 1:800, the take-off being coupled to shaft 4. It is thus possible to obtain repetition rates varying from hours to months.

Regarding the mechanical coupling between servomotor 8 and temperature control 2, it is obvious that a gear reduction mechanism may be interposed between the motor and the control. In this way the angular movement of control 2 may be varied to any desired extent with any given angular movement of driving motor 3. Similar results can alternatively be obtained by changes in the resistive circuits elements as exemplified by variable resistors 30 and 31 in Fig. 3.

It is preferred that amplifier 7 be operated at a sensitivity level which produces slight oscillation of servomotor 8. The resulting oscillation of the temperature control 2 increases accuracy by reducing the effect of the temperature differential, however small, which exists between the "on" and "off" stages of the thermostat.

It will also be apparent to one versed in the art that relatively great control precision may be obtained if the circuit parameters are chosen so that the voltages generated are an accurate function of the voltage output of a given thermocouple at the temperature which is being represented at any time. A thermocouple of the given type may then be exposed to the actual temperature obtained in the controlled refrigerator. The error voltage generated by this thermocouple, when the box is in error, may then be fed back into the balancing bridge or generating potentiometer in such a way as to cause a correcting adjustment of the servo system.

Having thus described my invention, I claim:

1. A system for producing cyclical temperature variations according to a predetermined pattern comprising a refrigerator, a temperature setting element for controlling the temperature in said refrigerator, a variable-speed motor, a generator coupled to said motor for producing an electrical signal of cyclically varying intensity, a conversion means connected with said generator for converting said signal into mechanical movement which varies as a function of the intensity of the signal, and a linkage between said conversion means and said temperature setting element.

2. A system for producing cyclical temperature variations according to a predetermined pattern comprising a refrigerator, a temperature setting element for controlling the temperature in said refrigerator, a variable-speed motor, a generator coupled to said motor for producing an electrical signal of cyclically varying intensity, an amplifier for amplifying said signal, a servomotor for converting said amplified signal into rotary movement which varies as a function of the intensity of the signal, balancing means for said servomotor and a linkage between said servomotor and said temperature setting element.

3. A system for producing cyclical temperature variations according to a predetermined pattern comprising a refrigerator, a temperature setting element for controlling the temperature in said refrigerator, a variable-speed motor, a potentiometric generator coupled to said motor, said generator producing an electrical signal which varies in intensity in accordance with a predetermined cyclic pattern, an amplifier for amplifying said signal, a servomotor for converting said amplified signal into rotary movement which varies as a function of the signal pattern, a resistance bridge balancer coupled to said servomotor, and a linkage between said servomotor and said temperature setting element.

4. A system for producing cyclical temperature variations in a refrigerator according to a predetermined pattern comprising: a potentiometric signal generator adapted to generate an electrical signal which varies in intensity according to a predetermined cyclic pattern; a variable speed motor coupled to the signal generator for operating said generator through its cycle; an amplifier connected at its input side to the signal generator for amplifying the cyclically varying signal; a servomotor connected to the output side of the amplifier adapted to convert the amplified signal into rotary movement which varies as a function of the generated signal pattern; a resistance bridge balancer coupled to the servomotor; a refrigerator having temperature control means mechanically coupled through said control means to the servomotor, whereby the cyclically varying signal pattern is transmitted to said temperature control means and the temperature within the refrigerator is caused to vary in a cyclic pattern which is a function of the signal generated; and variable resistive means coupled in the signal generator circuit for varying the function of the rotary movement in respect to the generated signal.

References Cited in the file of this patent

UNITED STATES PATENTS

| | | |
|---|---|---|
| 1,420,348 | Swift | June 20, 1922 |
| 1,936,324 | Carson | Nov. 21, 1933 |
| 2,144,105 | Coleman | Jan. 17, 1939 |
| 2,208,623 | Bond | July 23, 1940 |
| 2,220,028 | Smith | Oct. 29, 1940 |
| 2,250,899 | Young | July 29, 1941 |
| 2,298,521 | Uehling | Oct. 13, 1942 |
| 2,491,606 | Dickey | Dec. 20, 1949 |